UNITED STATES PATENT OFFICE.

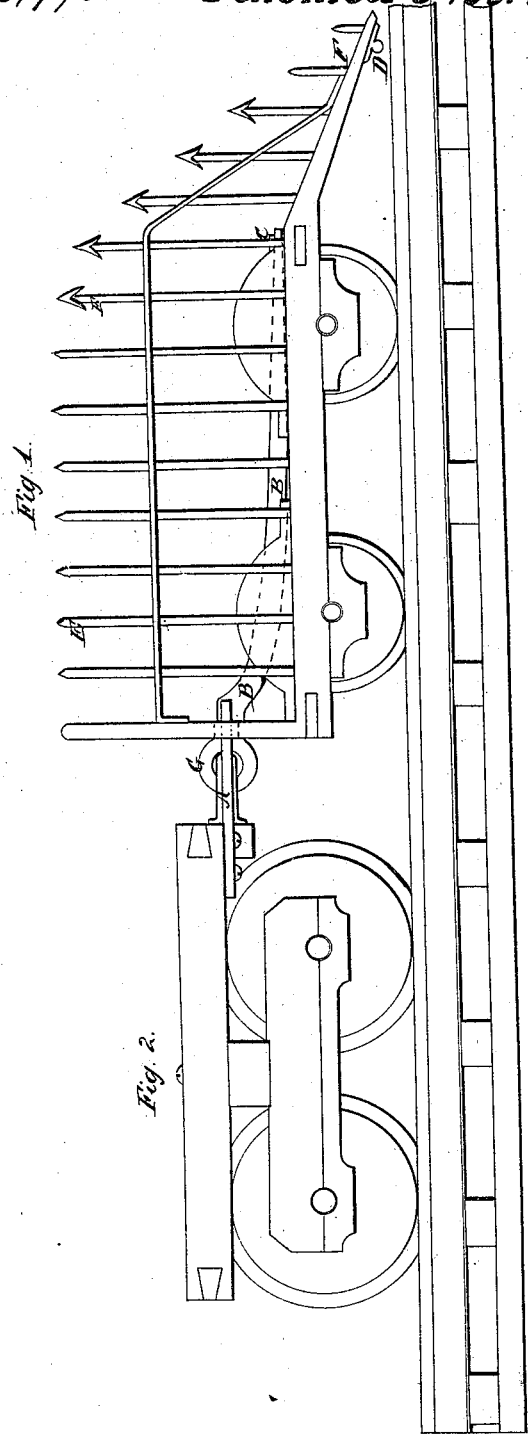

A. LIVINGSTON JOHNSON, OF BALTIMORE, MARYLAND.

MACHINE FOR PREVENTING ENGINES AND RAILROAD-CARS FROM BEING THROWN FROM THE TRACK.

Specification of Letters Patent No. 25,970, dated November 1, 1859.

*To all whom it may concern:*

Be it known that I, A. LIVINGSTON JOHNSON, of Baltimore, in the State of Maryland, have invented a new and useful device for preventing railroad-cars from being thrown from the track by taking up and retaining every obstacle found on the same, which device I call a "pioneer safety-car;" and I do hereby declare the following to be a full and exact description thereof, reference being had to the accompanying drawings in which—

Figure 1 is a side elevation or view of the safety car, which is designed to be used in front of locomotives in place of the cow catchers now generally in use. Fig. 2 is a side-view of the forward truck of the locomotive.

A, Fig. 2, are two iron bars, intended to accomplish the double purpose of preventing the safety car from turning over in case of a heavy weight being thrown on one side of it, and also to prevent the engine or car from mounting upon each other by keeping them in line, in cases where the train is suddenly stopped from any cause.

B, Fig. 1, is a strong iron bar connecting the locomotive and safety car, and is so arranged by a connection forward of the front axle as to push or propel the safety car forward from a front connection and from its position effectually prevents the safety car from leaving the track.

C, Fig. 1, is one way by which the safety car may be connected to the iron bar B.

D, Fig. 1, are projections or rollers placed under each side of the front of the safety car, and so adjusted as to strike the rails before the front edge of the car in case of a heavy weight being thrown upon the latter, sufficient to cause the car to tilt forward, and thus cause the car to pass safely over any slight inequalities in the rails until the train could be stopped.

E, Fig. 1, are metal bars of iron some of them barbed, and so arranged as to penetrate and securely hold any animal or other matter taken up by the safety car.

F, Fig. 1, shows the form and position of the front end of the safety car, which may be so adjusted as to reach within two inches of the rail, and thus prevent the possibility of any animal or other substance getting under the wheels from that direction large enough to throw the cars from the road.

G, Fig. 1, shows a good way of connecting the locomotive to the safety car, by which it will be seen that the latter will not be affected in the least by the oscillations of the former, but will pursue its independent smooth and even course upon the rails.

The entire floor of the safety car is solid or tight, and may be made of sheet iron or wood, supported by iron lattice work. The tight bottom may be dispensed with if thought best. The barbed projections across the forward part of the safety car may in like manner be dispensed with and the beveled portion of the floor of the car in front, instead of being smooth, may have short projecting points of metal inserted in it or strips placed across to prevent any substance falling on that part of the car from slipping off.

The bars A, instead of extending from the locomotive to the car in advance of it, may be put upon the advanced car and extend back into or through loops or mortises on the locomotive frame. The bar B, which is in effect the link or drag bar, has a hook or deadeye as at G, at its rear end which connects with a bolt hook, or dead eye on the front of the locomotive, and from thence it extends forward and downward toward the front of the safety car, and may be secured thereto by a king bolt c. The object and effect of this connection is to cause the propelling force that moves the forward car, to aid in holding said forward car onto the track at its front, the bars A effecting a similar purpose at its rear.

What I claim as my invention and desire to secure by Letters Patent is—

1. In combination with a locomotive and a pioneer safety car in advance of it, the bars A fastened to one and extending into loops or mortises in the other to prevent the lighter car from leaving the track or one from mounting or riding one on the other in case of accident or sudden stoppage, substantially as described.

2. I also claim in combination with the locomotive, and pioneer safety car in advance of it, the link or drag bar B, so connected thereto, as that the propelling force transmitted through it shall tend to hold the forward part of the safety car to the track substantially as described.

A. LIVINGSTON JOHNSON.

Attest:
JOHN S. HOLLINGSHEAD,
JOHN THAW.